Patented Aug. 7, 1934

1,968,887

UNITED STATES PATENT OFFICE 1,968,887

METHOD OF MAKING RUBBER ARTICLES

Merrill E. Hansen, Akron, Ohio, assignor to American Anode Inc., Akron, Ohio, a corporation of Delaware No Drawing. Application August 17, 1932, Serial No. 629,131

8 Claims. (Cl. 18—58)

This invention relates to the manufacture of shaped rubber articles from aqueous dispersions of rubber and more particularly to a method of making such articles in which rubber is deposited from an aqueous dispersion upon a shaped form by the action of coagulating ions diffusing from the form into the dispersion.

In the manufacture of rubber articles by such a method, an impervious form of a desired shape is coated with a coagulant-containing composition, the coated form immersed in an aqueous rubber dispersion and allowed to remain therein for a time sufficient to allow a coherent layer of rubber of suitable thickness to deposit thereon through the action of coagulating ions which continually diffuse into the dispersion from the coagulant-coated form and effect coagulation of the dispersed rubber particles at the surface of the form. The deposited rubber or rubber article is then washed, dried, vulcanized, and stripped from the form.

The coagulant used in the process may be a liquid acid such as formic, acetic, or sulphuric, or a solid acid like oxalic, or a metallic salt, preferably a salt such as the nitrate, chloride, etc. of a polyvalent metal such as calcium, magnesium or zinc, or like material capable of coagulating aqueous rubber dispersions, or mixtures of such coagulants.

The coagulant is preferably applied to the form as a solution containing 1 to 40% by weight of the active material dissolved in a volatile solvent such as acetone, alcohol, ethyl acetate, benzol, or even water, or mixtures of such solvents, the application being accomplished by spraying or brushing the liquid coagulant composition onto the form, or simply by dipping the form into the coagulant. The coating is usually allowed to dry for a short time to permit a sufficient quantity of the volatile solvent to evaporate to render the coating substantially non-flowing.

If a uniform rubber deposit is to be obtained on the form upon immersion thereof in the aqueous rubber dispersion, as is frequently desired, it is extremely important and essential that the coagulant coating, whether completely or only partially dried, shall be distributed as uniformly as possible over the surface of the form so that the concentration of coagulant itself may be uniform over the entire surface area contiguous to the rubber dispersion during the deposition operation.

Considerable difficulty has been experienced heretofore in obtaining rubber deposits of uniform thickness because of an inability to obtain such a uniform coagulant-containing coating. This difficulty has been particularly noticeable in manufacturing articles having complicated curved areas, as for example rubber gloves. Thin areas are frequently observed in finished gloves, more often at such points as between the fingers at their junction with the palm portion of the glove, and in other articles at like points where the contour of the surface is more complicated. The production of such thin spots in finished articles has been shown to result at least in part from a deficiency of coagulating ions at the corresponding point on the coagulant coated form, which in turn results from the non-uniformity of the coagulant coating itself.

The cause of the production of irregularities in the coagulant coating is not well understood at the present time, but since the effect is more noticeable at points on the form where a relatively greater surface area of the form is exposed to a given volume of surrounding atmosphere as at the finger crotches of glove forms, it is believed that the effect is due at least in part to a non-uniform rate of evaporation of volatile solvent from the composition resulting in uneven drying or setting of the coagulant coating.

During the evaporation of the volatile solvent from the coating on the form, the concentration of volatilized solvent in the surrounding atmosphere is necessarily greater at points such as those between the fingers of a glove form, which retards further evaporation of solvent and in turn causes the coating to dry more slowly, or in other words, to remain fluid longer at those points. As a consequence, the fluid coagulant apparently tends to flow away from such areas during the rotation and manipulation of the forms which usually accompanies the drying operation, and so produces light spots in the coagulant coating.

Again, the irregular coating may be due to uneven flow of the fluid coagulant caused by peculiar flow characteristics of the fluid resulting in the production of localized areas or "flow lines" of greater coagulant concentration per unit of surface area, or from other unfamiliar causes.

Regardless of the possible causes of the production of uneven coagulant coatings on the form and of resulting non-uniform rubber articles, a simple, economical, and highly efficient means has been discovered whereby these difficulties may be overcome and a higher percentage of rubber articles of uniform thickness throughout may be produced. Such means consists in so altering or regulating the drying and flowing conditions and characteristics of the coagulant solution that a uniform coating will be obtained over the surface of the form when the coating is dried.

This end is conveniently attained by heating the form, before application of the coagulant coating, to a temperature considerably above that of the surrounding atmosphere, but usually not above the boiling point of the coagulant solution.

When a form so heated is employed in the present process and coated with a fluid coagulant solution of the type described, evaporation of the volatile solvent is accelerated, both by the higher temperature and through the aid of convection currents set up around the form, so that there is no substantial variation in the rate of evaporation of solvent from different parts of the coating nor in the rate of change in the viscosity or fluidity of the coating at various points over the form. At the same time, the flow characteristics of the coating while in the fluid state appear to be favorably affected by the higher temperature which further contributes to produce a satisfactory coating.

Care should be exercised to keep the temperature of the form below the boiling point of the coagulant solution, for otherwise, evaporation of the solvent will become so rapid as to disrupt the coagulant coating. It will usually be desirable to maintain the form at a temperature not higher than several degrees below the boiling point of the coagulant solution to prevent the possibility of such an occurrence. Obviously the most effective temperature in a particular case must be determined by experiment under the conditions obtaining in that case, and the optimum temperature will vary widely in different cases.

The form may be conveniently heated externally by allowing it to remain in a hot air oven for a time sufficient to raise its temperature to the desired point, or it may be heated internally by electric means, by the circulation of a heated fluid through the interior of the form, or otherwise.

In certain cases it is desirable to use an internal heating means so that the temperature of the form may be maintained fairly constant for a considerable time, as when the dipping procedure is to be repeated several times, or to aid in the deposition or drying of the rubber.

It is sometimes desirable to heat different portions of the form to different temperatures. This may be accomplished by local internal heating or by heating the entire form to the same temperature and then rapidly cooling portions thereof to a lower temperature.

In practicing the present invention, an impervious form, which may be of glazed porcelain, glass, metal, bakelite, soft rubber, ebonite, or like material, for example a glove form, is well cleaned and placed in a hot air oven at a temperature of about 135° F. for thirty minutes. The heated form is removed from the oven and lowered into a tank containing a solution of 100 grams of calcium chloride in 1000 cc. of denatured alcohol. The form is withdrawn from the tank with an associated fluid coating, and slowly rotated several times in air to aid in evenly distributing the fluid coating while the volatile solvent is evaporating sufficiently to render the coating substantially non-flowing.

The coagulant-coated form is then carefully lowered into an aqueous dispersion containing 100 parts by weight of rubber added as concentrated latex, 1.3 parts of sulphur, 0.5 parts of organic accelerator, 1 part of an age-resister, 1 part of a mineral wax or resin, and any desired coloring ingredients. The form is allowed to remain in the dispersion until a rubber layer of a desired thickness has deposited thereon, then withdrawn and rotated several times about a horizontal or other axis to distribute the dispersion evenly and to allow it to become completely coagulated.

The rubber coated form is then lowered into a bath of circulating water and thoroughly washed after which the rubber is dried in a hot air oven, vulcanized in open steam, and stripped from the form.

The glove, or other article, is found to be satisfactorily uniform in thickness over its entire area, and free from any thin spots such as are often noticed in products of prior processes.

The term "rubber dispersion" is used herein to include all natural, artificial, concentrated, diluted, stabilized, thickened, or otherwise modified coagulable dispersions of rubber and like natural or synthetic gums or resins whether in the unvulcanized, vulcanized, or reclaimed condition. The rubber dispersions may contain vulcanizing agents, accelerators, age-resisters, fillers, coloring agents, and like compounding ingredients commonly used in rubber compositions.

I claim:

1. The method of making articles from a coagulable rubber dispersion which comprises coating with a fluid coagulant composition an impervious form heated to a temperature materially higher than that of the surrounding atmosphere, but below the boiling point of the coagulant composition, and associating the coated form with the rubber dispersion.

2. The method of making articles from a coagulable rubber dispersion which comprises coating with a fluid composition containing a coagulant an impervious form heated to a temperature sufficiently higher than that of the surrounding atmosphere materially to modify flow characteristics of the fluid compositions, and associating the coated form with the rubber dispersion.

3. The method of making articles from a coagulable rubber dispersion which comprises coating with a fluid composition containing a coagulant in a liquid vehicle, an impervious form heated to a temperature sufficiently higher than that of the surrounding atmosphere materially to modify flow characteristics of the fluid composition but not above its boiling point, and associating the coated form with the rubber dispersion.

4. The method of making articles from an aqueous rubber dispersion which comprises applying a coating of a composition containing a coagulant in a volatile solvent to the surface of an impervious form heated to a temperature sufficiently higher than that of the surrounding atmosphere to accelerate evaporation of the solvent from the coating but below the boiling point of the coagulant solution, and associating the coated form with the rubber dispersion.

5. The method of making articles from an aqueous rubber dispersion which comprises applying a coating of a composition containing a salt of a polyvalent metal dissolved in a volatile organic solvent to the surface of an impervious form heated to a temperature considerably above that of the surrounding atmosphere but not above the boiling point of the coagulant solution, allowing at least a part of the solvent to evaporate, and associating the coated form with the rubber dispersion.

6. The method of making articles from an aqueous rubber dispersion which comprises applying a fluid composition, containing a coagulant in a volatile solvent to the surface of an impervious form having portions locally heated to temperatures considerably higher than that of the surrounding atmosphere, allowing at least a part of the solvent to evaporate, and then associating the form with the aqueous rubber dispersion.

7. The method of making articles from an aqueous rubber dispersion which comprises heating an impervious form to a temperature considerably higher than that of the surrounding atmosphere, cooling portions of the form, applying to the differentially heated form a fluid composition containing a coagulant in a volatile solvent, allowing a substantial portion of the solvent to evaporate, and associating the form with the rubber dispersion.

8. The method of making a relatively thin rubber glove of highly uniform thickness which comprises heating an impervious glove form to a temperature considerably higher than that of the surrounding atmosphere, dipping the heated form into a fluid composition containing a coagulant dissolved in a solvent which is readily volatile at the temperature of the form, withdrawing the form together with a thin coating of coagulant solution, allowing a portion of the solvent to evaporate from the coating, dipping the coated form into an aqueous dispersion of rubber, and drying the resultant rubber deposit.

MERRILL E. HANSEN.